United States Patent [19]
Wurmb et al.

[11] B 4,080,349
[45] Mar. 21, 1978

[54] GLASS-FIBER-REINFORCED THERMOPLASTIC MOLDING COMPOSITIONS SHOWING IMPROVED FLOWABILITY AND TOUGHNESS

[75] Inventors: Rolf Wurmb, Heidelberg; Dietrich-Wolfgang Mueller, Dossenheim; Hans Georg Dorst, Deidesheim; Klaus Bronstert, Carlsberg; Rainer Theysohn, Ludwigshafen, all of Germany

[73] Assignee: BASF Aktiengesellschaft, Ludwigshafen, Germany

[21] Appl. No.: 507,456

[22] Filed: Sep. 19, 1974

[44] Published under the second Trial Voluntary Protest Program on March 9, 1976 as document No. B 507,456.

[51] Int. Cl.² .................................................. C08L 9/00
[52] U.S. Cl. ............................ 260/28 R; 260/28.5 A; 260/28.5 R; 260/37 N; 260/37 PC; 260/37 AL; 260/40 R 260/857 G
[58] Field of Search .................. 260/28, 285 A, 42.18, 260/18 N, 23 S, 23 H

[56] References Cited

U.S. PATENT DOCUMENTS

| | | | |
|---|---|---|---|
| 3,787,344 | 1/1974 | Kenaga et al. | 260/28.5 A |
| 3,826,074 | 7/1974 | Uffner | 260/28 |

*Primary Examiner*—Lewis T. Jacobs
*Attorney, Agent, or Firm*—Johnston, Keil, Thompson & Shurtleff

[57] ABSTRACT

Glass-fiber-reinforced thermoplastic molding compositions showing improved flowability and toughness and containing from 0.1 to 2% by weight, based on the total mixture, of a low molecular weight polyolefin wax to which from 2 to 50% by weight of polar side chains have been grafted.

7 Claims, No Drawings

GLASS-FIBER-REINFORCED THERMOPLASTIC MOLDING COMPOSITIONS SHOWING IMPROVED FLOWABILITY AND TOUGHNESS

This invention relates to glass-fiber-reinforced thermoplastic molding compositions to which polyolefin waxes containing grafted polar side chains are added to act as lubricants.

Glass-fiber-reinforced thermoplastic are distinguished by good mechanical properties and high thermal resistance. When used in injection-molding processes, they must exhibit adequate flowability at the high temperatures necessary. Thus it is usual to add lubricants thereto, for example metal salts or esters of fatty acids. Although these lubricants improve the flowability of the molten composition and in many cases also improve the surface of the moldings, they also impair the mechanical properties such as the tensile strength and toughness and frequently reduce the K value, particularly of polyamides.

It is an object of the invention to provide lubricants for glass-fiber-reinforced thermoplastics which give a good surface of the moldings whilst not impairing the mechanical properties and K value thereof.

According to the invention, this object is achieved by the addition of from 0.1 to 2% by weight of a low molecular weight polyolefin wax to which from 2 to 50% by weight of polar side chains have been grafted.

Of the thermoplastics which may be reinforced with glass fibers, the polyamides and in particular polycaprolactam are preferred. However, the invention is also applicable to other glass-fiber-reinforced thermoplastics, for example styrene polymers and in particular copolymers of styrene and acrylonitrile and also polyesters such as polybutylene terephthalate, polyethylene terephthalate and polycarbonate and also polyoxymethylene.

The glass fibers are contained in the thermoplastics in usual amounts of from 10 to 60% by weight. They may be treated with conventional sizes and binders.

The lubricant used consists of from 0.1 to 2% and preferably from 0.3 to 1%, by weight, of a low molecular weight polyolefin wax to which from 2 to 50% by weight of polar side chains have been grafted. The molecular weight of the polyolefin wax is preferably from 1,000 to 20,000 and in particular from 2,000 to 10,000. Polyethylene waxes have been found to be particularly suitable, but low molecular weight polypropylene may also be used.

The waxes contain from 2 to 50%, and preferably from 5 to 20%, by weight, of grafted polar side chains. Particularly suitable side chains are copolymers of styrene and maleic anhydride. The preparation of these graft polymers may take place by polymerizing styrene and maleic anhydride in a molar ratio of about 1:1 in the presence of the polyolefin wax either in substance or in solution and preferably at elevated temperature. A graft polymerizing process of this kind is described, for example, in German Published Application No. 2,108,749. The structure of the graft polymers is not known with certainty, but it is assumed that the side chains are relatively short chains containing styrene and maleic anhydride in an alternating relationship.

The addition of the grafted waxes, as proposed by the invention, as lubricants not only improves the flowability of the glass fiber-reinforced thermoplastics but also improves the surface thereof without impairing the mechanical properties. Any change in the mechanical properties will manifest itself in the viscosity of the products. It has been found that the reduction in the K value when using the lubricants proposed by the invention is considerably less than when conventional lubricants are used. This is particularly surprising, because neither the ungrafted waxes nor, for example, copolymers of styrene and maleic anhydride or copolymers of ethylene and acrylic acid have this effect.

The glass-fiber-reinforced molding compositions may contain conventional additives, for example fillers such as glass and spheres, asbestos and silica flour, processing auxiliaries such as talcum and calcium fluoride, and also stabilizers, pigments and dyes.

In addition to the lubricants of the invention, the glass-fiber-reinforced thermoplastics may contain conventional lubricants such as salts, esters or amides of higher fatty acids in amounts of from 0.05 to 1.5% by weight. This provides further improvement in the flowability of the thermoplastics. The impairing effect of the latter on the mechanical properties may in such cases be offset by the use of larger amounts of the grafted waxes.

The molding compositions of the invention may be prepared by conventional methods for the manufacture of glass-fiber-reinforced thermoplastics. Preparation may be effected in any suitable kneader, the thermoplastics being melted and then mixed with the glass fibers, fillers, lubricants and other additives. If desired, the lubricants may be added in the form of a concentrate in the plastics material. They may be applied to the plastics material prior to the preparation of the mixture or they may be subsequently added to the mixture at the injection molding stage.

In the following Example, the parts and percentages are by weight. The K values are those determined according to DIN 53,726 on a 1% solution in concentrated sulfuric acid.

EXAMPLE 65 parts of polycaprolactam having a K value of 73 were mixed with various amounts of lubricant in a high-speed mixer and then melted in an extruder at from 260° to 280°C. 35 parts of glass fibers were then added to the molten mixture through the vent, which glass fibers had been previously treated with a size and an aminopropyl silane as adhesion promoter.

Table 1 lists the various lubricants used.

TABLE 1

| Test | Lubricant | Degree of grafting [%] | Amount [%] |
|---|---|---|---|
| a | — | — | — |
| b | calcium stearate | — | 0.5 |
| c | polyethylene wax | ungrafted | 0.5 |
| d | polyethylene wax | 8 | 0.5 |
| e | polyethylene wax | 8 | 1.0 |
| f | polyethylene wax | 22 | 0.5 |
| g | polyethylene wax | 45 | 0.5 |
| h | calcium stearate plus polyethylene wax | 8 | 0.5  1.0 |
| i | N,N'-distearoylethylene diamide plus polyethylene wax | 8 | 0.5  1.0 |

In each case, the molecular weight of the polyethylene wax was 6,500. Grafting was effected at 165°C using a mixture of styrene and maleic anhydride.

The extrudates were cooled and granulated. The granules were then injection molded to specimens at temperatures of from 260° to 300°C, the specimens then being tested to give the mechanical data listed in Table 2 below. The specimens were tested when dry immediately after injection-molding. The impact resistance in [cm.kg cm$^{-2}$] was determined as proposed in DIN 53,453. The flowability was determined indirectly by measuring the minimum injection pressure required to completely fill an injection mold at a plastics temperature of 300°C.

TABLE 2

| Test | Impact resistance 260°C | 300°C | K value of molding 260°C | 300°C | Injection pressure [kg/cm$^2$] |
|---|---|---|---|---|---|
| a | 50.2 | 52.3 | 71.8 | 70.3 | 550 |
| b | 46.6 | 49.2 | 68.6 | 64.0 | 380 |
| c | 47.8 | 50.0 | 69.9 | 67.3 | 390 |
| d | 49.7 | 53.7 | 73.7 | 74.2 | 430 |
| e | 50.8 | 53.4 | 74.9 | 74.2 | 440 |
| f | 50.5 | 54.7 | 74.2 | 73.9 | 460 |
| g | 49.7 | 54.8 | 75.3 | 74.6 | 470 |
| h | 49.9 | 52.7 | 72.3 | 72.3 | 390 |
| i | 50.2 | 53.0 | 73.1 | 72.4 | 380 |

Tests *d* to *i* are within the scope of the invention. The product obtained in test *a* has a very poor surface.

We claim:

1. Glass-fiber-reinforced thermoplastic molding compositions wherein said thermoplastic is a polyamide containing from about 10 to 60% by weight of glass fibers and containing from 0.1 to 2% by weight, based on the weight of the molding composition, of a low molecular weight wax having a molecular weight of from about 1,000 to 20,000 to which from 2 to 50% by weight of polar side chains have been grafted, said side chains comprising copolymerized styrene and maleic anhydride, said chains containing styrene and maleic anhydride in alternating relationship, whereby said grafted polyethylene wax is a lubricant to improve the flowability and surface of the glass-reinforced polyamide.

2. Glass-fiber-reinforced thermoplastic molding compositions as claimed in claim 1, wherein the polyethylene wax has a molecular weight of from 2,000 to 10,000.

3. Glass-fiber-reinforced thermoplastic molding compositions as claimed in claim 2 and additionally containing from 0.05 to 1.5% by weight of a conventional lubricant.

4. Glass-fiber-reinforced thermoplastic molding compositions as claimed in claim 1 wherein said thermoplastic is polycaprolactam.

5. Glass-fiber-reinforced thermoplastic molding compositions as claimed in claim 3 wherein the amount of wax is from 0.3 to 1% by weight and wherein from 5 to 20% by weight of polar side chains have been grafted onto said wax.

* * * * *

UNITED STATES PATENT AND TRADEMARK OFFICE
CERTIFICATE OF CORRECTION

PATENT NO. : 4,080,349
DATED : March 21, 1978
INVENTOR(S) : Rolf Wurmb et al

It is certified that error appears in the above-identified patent and that said Letters Patent are hereby corrected as shown below:

In the Heading, insert -- [30] Foreign Application Priority Date  September 28, 1973  Germany 23 48 840 --

Col. 4, line 2, after "weight" insert --- polyethylene -- line 23, change "Claim 3" to -- Claim 4 --.

Signed and Sealed this

Second Day of October 1979

[SEAL]

Attest:

RUTH C. MASON
Attesting Officer

LUTRELLE F. PARKER
Acting Commissioner of Patents and Trademarks